United States Patent [19]
Yli-Kotila et al.

[11] Patent Number: 5,539,925
[45] Date of Patent: Jul. 23, 1996

[54] RADIO SYSTEM WITH POWER-SAVING FEATURE FOR MOBILE STATIONS, EFFECTIVE DURING TRANSMISSION BREAKS OF THE ASSOCIATED FIXED RADIO STATION

[75] Inventors: Taavi Yli-Kotila, Äänekoski; Osmo Schroderus, Suolahti; Tapio Paavonen, Saarijärvi, all of Finland

[73] Assignee: Nokia Telecommunications OY, Espoo, Finland

[21] Appl. No.: 325,221

[22] Filed: Jan. 3, 1995

[30] Foreign Application Priority Data

Apr. 24, 1992 [FI] Finland ................... 921868

[51] Int. Cl.$^6$ ................... H04B 7/26
[52] U.S. Cl. ................ 455/38.3; 455/54.1; 455/56.1; 455/68; 455/343; 370/95.1
[58] Field of Search ............ 455/38.2, 38.3, 455/54.1, 54.2, 56.1, 68, 70, 343; 370/85.7, 93, 95.1, 95.3, 110.1

[56] References Cited

U.S. PATENT DOCUMENTS 4,449,248   5/1984   Leslie .
5,031,231   7/1991   Miyasaki .
5,241,691   8/1993   Owen .................... 455/54.2

FOREIGN PATENT DOCUMENTS 282087   9/1988   European Pat. Off. .
473465   3/1992   European Pat. Off. .

*Primary Examiner*—Chi H. Pham
*Attorney, Agent, or Firm*—Cushman Darby & Cushman

[57] ABSTRACT

A radio system including a plurality of fixed radio stations positioned apart from each other within an area covered by the radio system, and at least one mobile radio station signalling with one of the fixed radio stations at a time. The system has at least one frequency channel serving as a control channel, a plurality of fixed radio stations sharing the control channel in the time domain for transmitting control signals. In order to reduce the power consumption of the mobile radio station, a message is transmitted at the end of the transmission period of each fixed radio station to the at least one mobile radio station, and in response to the message, the mobile radio station switches off its unnecessary power-consuming portions, such as a radio receiver, during the transmission break of the respective fixed radio station for a turn-off period indicated by the extinction message.

2 Claims, 1 Drawing Sheet

RADIO SYSTEM WITH POWER-SAVING FEATURE FOR MOBILE STATIONS, EFFECTIVE DURING TRANSMISSION BREAKS OF THE ASSOCIATED FIXED RADIO STATION

FIELD OF THE INVENTION

The invention relates to a radio system comprising a plurality of fixed radio stations positioned apart from each other within an area covered by the radio system, and at least one mobile radio station signalling with one of the fixed radio stations at a time, the system comprising at least one frequency channel serving as a control channel, a plurality of fixed radio stations sharing the control channel in the time domain for transmitting control signals.

BACKGROUND OF THE INVENTION

In certain cellular radio telephone systems, a plurality of fixed radio stations or base stations share a common frequency channel called a control channel in the time domain, and transmit sequentially on this channel in respective time slots. This type of system is used when there is a lack of radio channels, and the traffic density is low. In such radio telephone systems, each radio telephone responds only to the control signal transmitted by the base station to which the radio telephone has registered, and signals back to the system (to the exchange) only via this particular base station during the reception of the control signal.

SUMMARY OF THE INVENTION

The object of the present invention is to reduce the power consumption of subscriber equipment used in this type of radio system, particularly the power consumption of portable telephones.

This is achieved by means of a radio system of the type described in the foregoing sections, which according to the invention is characterized in that the duration of the transmission period assigned to each fixed radio station on the control channel is variable between minimum and maximum values allotted to the fixed radio station in accordance with the number of the inbound and outbound messages of the respective fixed radio station, and that a message is transmitted at the end of the transmission period of each fixed radio station to the at least one mobile radio station, and in response to said message, the mobile radio station switches off its unnecessary power-consuming portions, such as a radio receiver, during the transmission break of the respective fixed radio station for a turn-off period indicated by said turn-off message.

As a mobile radio station, such as a radio telephone, receives signalling messages only via the fixed radio station to which it has engaged itself, the radio telephone may reduce its power consumption in accordance with the invention during the transmission breaks of the fixed radio station by switching off its unnecessary circuits and circuits having a high power consumption. According to the invention, a so-called turn-off message is transmitted at the end of the transmission period of the base station. The turn-off message switches the radio telephone to a low-power state and indicates a turn-off time which determines the allowable duration of the low-power state of the radio telephone. The amount of power saved in the radio telephone depends on the number of fixed radio stations utilizing the same time-shared control channel and on the duration of the signalling bursts transmitted by the dedicated fixed radio station of the radio telephone. The duration of the signalling bursts transmitted by the fixed radio station, i.e. the duration of the transmission periods, is varied adaptively, depending on the signalling load of the fixed radio station. It is therefore necessary that the allowable turn-off time is indicated to the radio telephone in order to achieve efficient power saving and to avoid the loss of calls. Typically, four fixed radio stations use the same control channel on a time-shared basis, and the minimum duration of the burst of one fixed radio station is about 500 milliseconds. The duration of the break between transmission bursts or transmission periods of a particular fixed radio station is thus 1,500 milliseconds. Accordingly, in the radio telephone of the radio system according to the invention, it is very easy to achieve a power consumption at least two times lower than that of a conventional radio telephone. This is particularly advantageous in portable radio telephones and hand-held telephones using a rechargeable battery as a power source. The invention allows the operation time of the battery to be increased so that it is at least two times longer than without the power saving function according to the invention.

BRIEF DESCRIPTION OF THE DRAWINGS

In the following, the invention will be described in more detail by means of an illustrating embodiment with reference to the attached drawing, in which.

DETAILED DESCRIPTION OF A PREFERRED EMBODIMENT OF THE INVENTION

Figure 1:
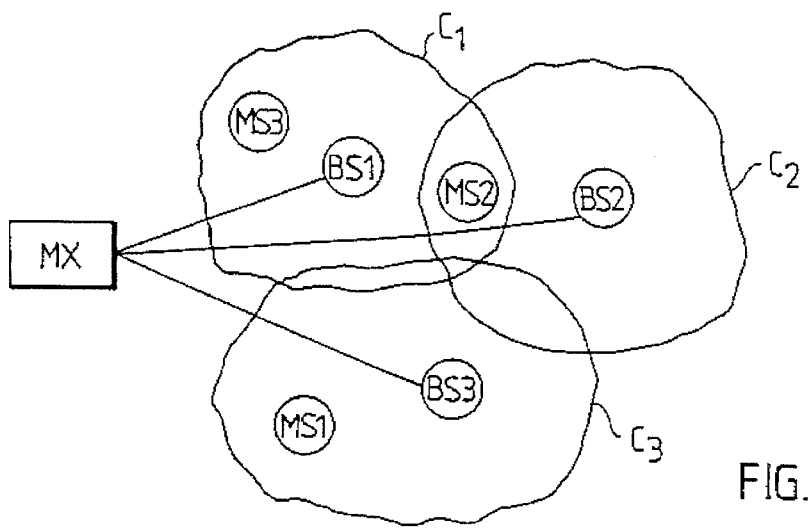
FIG. 1 shows a radio system in which the invention can be applied.

FIG. 1 shows a radio telephone system in which the geographical area covered by the system is divided into smaller radio areas or radio cells C1, C2 and C3 so that adjacent cells preferably overlap. Each cell C1, C2 and C3 comprises at least one fixed multi-channel transceiver equipment BS1, BS2 and BS3, called a base station herein. All of the base stations BS1, BS2 and BS3 are connected by fixed links, such as cables, to a mobile radio exchange MX, which thus controls several base stations BS.

Predetermined radio frequencies or radio channels are assigned to the radio system for speech or data connections. The base stations BS establish a radio link over the radio channels with remote radio stations or radio telephones MS roaming in the cells. The mobile radio exchange MX allocates these radio channels to the base stations separately for each call, e.g. on the dynamic allocation principle so that the same frequencies are not used simultaneously at adjacent base stations which could interfere with each other.

Figure 2:
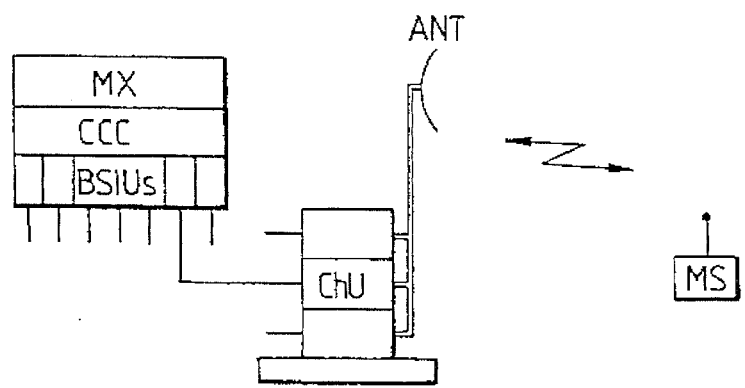
FIG. 2 illustrates the interconnection between a mobile exchange and a base station.

FIG. 2 illustrates the interconnection between the mobile radio exchange MX and the base station BS. The mobile radio exchange MX contains several base station interface units BSIU, each one of which serves as a link between a call control computer CCC and a base station radio channel unit ChU. Each base station BS has several radio channel units ChU each comprising a radio transceiver. The interface unit BSIU may be connected to a traffic channel or to a control channel. In the control channel mode, the BSIU may operate as a dedicated control channel, an undedicated control channel or a time-shared control channel. The invention is applied in a case where a plurality of base stations BS1, BS2 and BS3 share a common frequency channel which they use as a control channel to transmit their control messages sequentially on a time-shared basis. One of the above-mentioned BSIUs is thereby permanently dedicated to the time-shared control channel, and it will be called a time-shared control channel interface unit TSCCIU hereinbelow.

The system may comprise several base station groups each having a dedicated control channel. The transmission sequence starts from a predetermined base station and ends with a break before it restarts with the transmission of the same base station. In the preferred embodiment of the invention, the control signals or bursts transmitted on the control channel comply with the MPT 1327 standard issued by the British Department of Trade and Industry. Each burst is thus preceded by a break during which no base station BS transmits on the control channel. Each burst contains a frame starting with the fields LET, PREAMBLE and SYNC, as described in MPT 1327, chapter 3.3.3.1. Each burst is also provided with the identity of the transmitting base station.

One or more radio transceivers or radio telephones MS1, MS2 and MS3 roam freely within the area of the radio telephone system. Each radio telephone MS has to register to one of the base stations BS when it resides within the area of the system. In this way, the system keeps record of the rough location of the radio telephones MS for call set-up purposes. The radio telephones MS are allowed to roam freely from one cell C to another, but upon moving to another cell they have to register to the base station BS of the cell C. The radio telephone MS is considered to be active in the cell C when it has selected the cell in compliance with a certain procedure, the base station BS of the cell has transmitted a burst and the radio telephone MS has received the identity of the base station.

After the radio telephone has registered to the base station MS, it receives signalling messages and calls only via this base station BS. Correspondingly, the radio telephone MS may transmit signalling messages to the base station BS only when the base station BS transmits simultaneously on the control channel. The length of each individual burst on the control channel within the transmission period of the base station BS can be varied dynamically between the minimum and maximum values allotted to the respective base station BS in accordance with the number of the inbound and outbound messages of the respective base station BS.

As already mentioned above, the radio telephone MS receives signalling only via a base station to which it has registered. With the exception of possible field intensity and signal quality measurements, the radio telephone has no reason to receive signalling bursts transmitted by other base stations during their assigned transmission periods. In the invention, this operational characteristic presents an opportunity which is utilized by switching off the receiver of the radio telephone MS and other possible unnecessary power-consuming radio telephone circuits, such as part of the control logic, between the transmission periods of the dedicated base station BS and during the transmission periods of other base stations. For this purpose, a turn-off message is transmitted to the radio telephone MS at the end of each signalling burst transmitted by the base station BS during its transmission period. The turn-off message permits the radio telephone MS to turn off its unnecessary power-consuming portions for a turn-off period indicated by the message. Typically, the turnoff period is equal to the period of time after which the next transmission period of the respective base station BS begins at the earliest. The turn-off message may also contain an information field which defines the radio telephones MS to which the turn-off message applies.

The information field may contain, e.g. part of the calling number of the radio telephone MS, e.g the three least significant bits of the calling number. Such a selective turn-off message allows predetermined radio telephones MS to be switched to the low-power state for a desired period of time, which may be longer than the time interval between two transmission periods of the base station.

In a system utilizing radio telephone signalling complying with the specification MPT 1327, the turn-off message according to the invention may be formed simply by determining desired information fields in a so-called Broadcast message, abbreviated BCAST message and specified in MPT 1327 p. 5 to 48.

Figure 3:
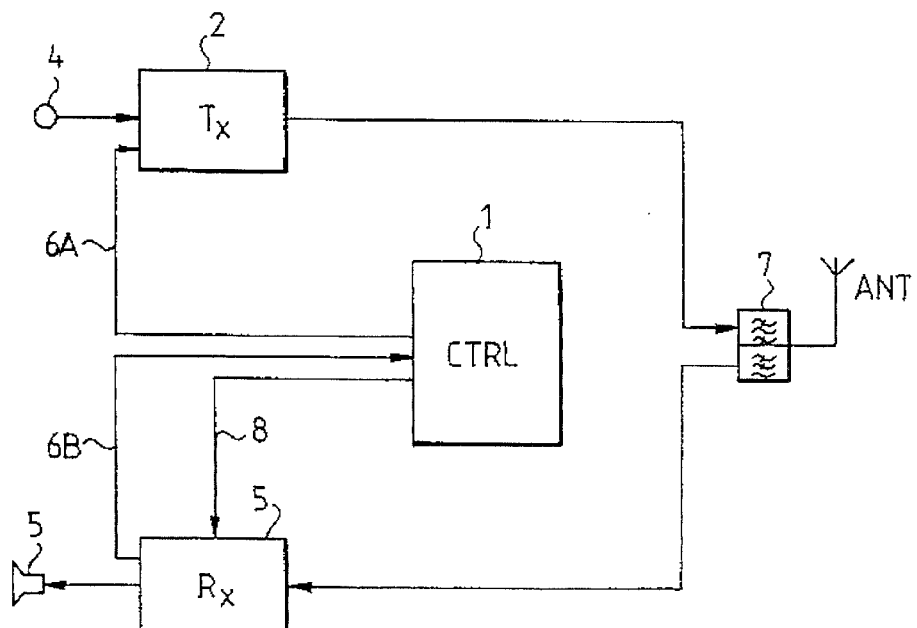
FIG. 3 is a schematic block diagram of a radio telephone according to the invention.

The radio telephone MS used in the radio system according to the invention is similar to radio telephones used previously except that it is also able, in response to the turn-off message transmitted by the base station, to turn off part of its circuitry for a period of time indicated by the turn-off message. FIG. 3 shows a schematic block diagram illustrating a radio telephone according to the invention. A reception-frequency RF signal received by an antenna ANT is applied via an antenna filter 7 to a radio receiver section 2, where it is mixed at one or more mixing stages into a baseband signal which is applied to a loudspeaker 5 or an external device. The radio receiver section 2 also extracts control signalling transmitted by the base station from the received RF signal; the control signalling is applied via an interface 6B to a control unit 1 of the radio telephone MS. A baseband signal from a microphone 4 or an external device is modulated in the transmitter section 2 to a transmitting frequency, and the transmitting-frequency modulated RF output signal is applied via a duplex filter 7 to the antenna ANT. In addition, the control unit 1 applies the signalling to be transmitted to the base station via a signalling interface 6A to the transmitter section 2, where it is modulated to the transmitting frequency.

Upon receiving the turn-off message according to the invention from the base station BS, the control unit 1 starts its internal turn-off time counter and causes the receiver 3 to be switched off via a control line 8. The control unit 1 may simultaneously switch off part of its own internal circuitry as unnecessary and possibly other unnecessary power-consuming portions of the radio telephone. When the internal counter of the control unit 1 reaches the turn-off time value received with the turn-off message, the control unit 1 starts the receiver 3 and other switched-off radio telephone sections. The turn-off program of the control unit is also able to recognize the part belonging to its own call number when selective turn-off messages are used.

The attached figures and the description related to them are only intended to illustrate the present invention. In its details, the radio system according to the invention may vary within the scope of the attached claims.

We claim:

1. A radio system comprising:

a plurality of fixed radio stations;

a plurality of mobile stations, each of said mobile stations being able to communicate with any of said plurality of fixed radio stations;

a plurality of radio channels serving as traffic channels between said mobile stations and said fixed stations;

a plurality of radio channels serving as control channels for control signalling between said mobile stations and said fixed stations;

at least one of said control channels being time-shared by a group of said fixed stations, each of said fixed stations in said group being assigned a transmission period on said time-shared control channel so that said transmission periods form a repetitive sequence of transmission periods;

the lengths of each of said transmission periods being dynamically varied between preset minimum and maximum values of said respective fixed station according to the traffic load at said respective fixed station;

each fixed station in said group being arranged to transmit, at the end of a respective transmission period thereof, a power-turn-off message indicating a power-turn-off period allowed to those of the mobile stations which are registered to the respective fixed station, said power-turn-off period being equal to a period of time between the current transmission period and the next transmission period of the respective fixed station.

2. A radio system comprising:

a plurality of fixed radio stations;

a plurality of mobile stations, each of said mobile stations being able to communicate with any of said plurality of fixed radio stations;

a plurality of radio channels serving as traffic channels between said mobile stations and said fixed stations;

a plurality of radio channels serving as control channels for control signalling between said mobile stations and said fixed stations;

at least one of said control channels being time-shared by a group of said fixed stations, each of said fixed stations in said group being assigned a transmission period on said time-shared control channel so that said transmission periods form a repetitive sequence of transmission periods;

the lengths of each of said transmission periods being dynamically varied between preset minimum and maximum values of said respective fixed station and according to the traffic load at said respective fixed station;

each fixed station in said group being arranged to transmit, at the end of a respective transmission period thereof, a selective power-turn-off message indicating a power-turn-off period allowed to those of the mobile stations which are indicated in said message from said fixed station, said power-turn-off period being at least equal in duration to a period of time between the current transmission period and the next transmission period of the respective fixed station.

\* \* \* \* \*

UNITED STATES PATENT AND TRADEMARK OFFICE
CERTIFICATE OF CORRECTION

PATENT NO.   : 5,539,925

DATED        : July 23, 1996

INVENTOR(S)  : YLI-KOTILA et al.

It is certified that error appears in the above-identified patent and that said Letters Patent is hereby corrected as shown below:

On the title page: [22] filed: should read PCT filed: "4-23-93".

add item [86], to include:
--PCT No.: PCT/FI93/00177--;
--§ 371 Date: January 3, 1995--;
--§ 102(e) Date: January 3, 1995--; and add item [87], to include:
--PCT Pub. No.: WO93/22883--;
--PCT Pub. Date: November 11, 1993--.

Signed and Sealed this

Eighth Day of October, 1996

*Attest:*

BRUCE LEHMAN

*Attesting Officer*     *Commissioner of Patents and Trademarks*